United States Patent [19]
Takano

[11] Patent Number: 5,700,198
[45] Date of Patent: Dec. 23, 1997

[54] ELASTIC COUPLING WITH SHAPED ELASTIC MEMBERS FOR SETTING A CIRCUMFERENTIAL/AXIAL ELASTICITY RATIO

[75] Inventor: Kazuya Takano, Kanagawa-ken, Japan

[73] Assignee: Bridgestone Corporation, Tokyo, Japan

[21] Appl. No.: 380,897

[22] Filed: Jan. 30, 1995

[30] Foreign Application Priority Data

Feb. 7, 1994 [JP] Japan .................. 6-034184

[51] Int. Cl.⁶ .................. F16D 3/28; F16D 3/70
[52] U.S. Cl. .................. 464/71; 464/93
[58] Field of Search .................. 464/71, 73, 76, 464/92, 93, 85, 137, 138

[56] References Cited

U.S. PATENT DOCUMENTS

| | | | |
|---|---|---|---|
| 2,037,048 | 4/1936 | Ruths | 464/71 |
| 2,220,622 | 11/1940 | Homer | 464/71 |
| 2,301,660 | 11/1942 | Ricefield | 464/71 X |
| 2,396,353 | 3/1946 | Venditty | 464/71 X |
| 2,753,702 | 7/1956 | Dunn | 464/93 |
| 3,422,637 | 1/1969 | Kelley | 464/93 |
| 3,823,576 | 7/1974 | Colletti et al. | 464/71 |
| 4,613,316 | 9/1986 | Reynolds | 464/137 X |
| 4,779,470 | 10/1988 | Morita et al. | 464/92 X |

FOREIGN PATENT DOCUMENTS

| | | |
|---|---|---|
| 4-160226 | 6/1992 | Japan . |
| 4-224314 | 8/1992 | Japan . |
| 5-141434 | 6/1993 | Japan . |
| 6-26528 | 2/1994 | Japan . |

*Primary Examiner*—Daniel P. Stodola
*Assistant Examiner*—William A. Rivera
*Attorney, Agent, or Firm*—Jordan and Hamburg

[57] ABSTRACT

An elastic coupling for connection between two shafts, driving and driven, to transmit power from one to the other shaft, comprising a disc having a central hole formed therein; a plurality of cylindrical members for connection to a driving shaft, disposed equidistantly from each other on a circle concentrical to the disc; and a plurality of other cylindrical members for connection to a driven shaft, disposed as regularly spaced on the circle on which the first cylindrical members are disposed, the first and second cylindrical members being laid alternately as regularly spaced from one another, the cylindrical members being surrounded at the circumference thereof each by an elastic member of rubber, adjacent ones of the elastic members being coupled to each other by means of the disc. Each of the elastic members is cut at the inner end portion thereof nearer to the center of the disc to avoid a full joining thereof to the disc, while it is exposed at the outer end portion thereof away from the disc center to also avoid a full joining thereof to the disc. Thus the elastic members are joined to the disc at the portions thereof other than their respective inner and outer portions.

4 Claims, 6 Drawing Sheets

ELASTIC COUPLING WITH SHAPED ELASTIC MEMBERS FOR SETTING A CIRCUMFERENTIAL/AXIAL ELASTICITY RATIO

BACKGROUND OF THE INVENTION

The present invention relates to an elastic coupling connecting two shafts to each other and transmitting torque from one shaft to the other, the coupling being used as a propeller and the like, and more particularly to an elastic coupling utilizable for connection of a propeller shaft which transmits a driving force from an engine for example, a steering shaft which transmits torque from a steering wheel and similar shafts.

A conventional elastic coupling of this type is shown in FIGS. 1 and 2. As shown, the coupling has three cylinders 100 for coupling with a driving shaft (not shown) and three cylinders 101 for coupling with a driven shaft (not shown). The cylinders 100 and 101 are alternately disposed in a disk 102 with their centers regularly spaced from one another on the circumference of a circle concentrical to a central opening 103 of the disk 102. Both these cylinders 100 and 102 have an outside diameter of 20 mm, inside diameter of 15 mm and a length of 35 mm. All the cylinders 100 and 101 are on the circumference of a single circle concentrical to the central opening 103 as mentioned above, but the cylinders 100 may be disposed on the circumference of one circle while the cylinders be disposed on the circumference of another circle, as long as the case may be, both of these circles are concentrical to the central opening 103. The cylinders 100 and 101 are completely surrounded rubber cylinders 104 and 105, respectively, which contribute to vibration absorption and dumping of abrupt load as well as to noise reduction when power or torque is transmitted between the shafts connected to each other by the elastic coupling. The rubber cylinders 104 and 105 have an outside diameter of 35 mm and a length of 33 mm. The disc 102 has disposed place, therein the rubber cylinders 104 and 105 surrounding the cylinders 100 and 101, respectively. The rubber cylinders 104 and 105 are independent of one another. The disc 102 is made of nylon and has a thickness of 30 mm and an outside diameter of 150 mm. The disc 102 serves to hold the cylinders 100 and 101 respectively in place, and also to transmitt a tensile force between the cylinders 100 connected to the driving shaft and cylinders 101 connected to the driven shaft when power is transmitted from the former to the latter shaft. Namely, the disc 102 works as a tension member. Generally, the coupling assembly is produced by first adhering the rubber cylinders 104 and 105, by vulcanization, around the cylinders 100 and 101, respectively, setting them in place, respectively, inside a mold used to form the disc 102, and then integrating them by injection of a synthetic resin into the mold. Otherwise, however, it may be produced by forming the cylinders 100 and 101 and then the rubber cylinders 104 and 105 about the cylinders 100 and 101, respectively, molding the disc 102 having openings 106 formed therein, and then forcibly fitting the rubber cylinders 104 and 105 surrounding the cylinders 100 and 101, respectively, into the respective openings 106. In this conventional elastic coupling, the outer circumference of each of the rubber cylinders 104 and 105 is a circle and also the circumference of each of the openings 106 is a circle. However, these circumferences may not always be circular.

The conventional elastic coupling is elastically in a direction axially thereof (in the direction of the center axis of a circle concentric to the disc 102 on which the cylinders 100 and 101 are disposed) than circumferentially thereof (in the circumferential direction of the concentric circle). In case of an elastic coupling for a steering shaft of a vehicle, for example, if it is designed elastically harder in a circumferential direction to improve the steering capability of the steering shaft, it will also be harder in an axial direction, so that the noise from a power steering pump is more likely to propagate inside the vehicle.

SUMMARY OF THE INVENTION

An object of present invention is to overcome the above-mentioned drawbacks of the prior art by providing an elastic coupling designed elastically harder in a direction circumferentially thereof than axially thereof.

The above object is accomplished by providing a disc-shaped elastic coupling comprising a disc having a central hole formed therein, a plurality of cylindrical members for connection to a driving shaft, disposed equidistantly from each other on a circle concentrical to the disc, and a plurality of other cylindrical members for connection to a driven shaft, disposed equidistantly from each other on the circle on which the first cylindrical members are disposed, the first and second cylindrical members being laid alternately as regularly spaced, the cylindrical members being surrounded each by an elastic member made of rubber, adjacent ones of the elastic members being coupled to each other by means of the disc, each of the elastic members being cut at the inner end portion thereof, nearer to the center of the disc, to avoid a full joining thereof to the disc while being exposed at the outer end portion thereof, farther from the disc center, to also avoid a full joining thereof to the disc, thus the elastic members being joined to the disc at the portions thereof other than their respective inner and outer end portions. Thus, since the elastic members are not joined at the above-mentioned inner and outer end portions thereof to the disc, they are freely movable radially. Therefore, compared with an elastic coupling of which the elastic members are joined along the entire outer circumference thereof to the disc, the elastic coupling according to the present invention has a smaller portion contributing to the shear force acting on the elastic members axially thereof, so it is elastically lower axially thereof.

Since the elastic members are joined to the disc circumferentially of the concentric circle on which they are disposed, the circumferential elasticity thereof is almost the same as that of such elastic members joined all around to the disc. Therefore, the circumferential/axial elasticity ratio of the elastic coupling according to the present invention is greater than that in the prior art elastic coupling.

DETAILED DESCRIPTION OF THE PREFERRED EMBODIMENTS

For better understanding of the present invention, preferred embodiments of elastic couplings according to the present invention will be described below purely by way of illustrative and non-limiting examples, with reference to the drawings.

Figure 1:
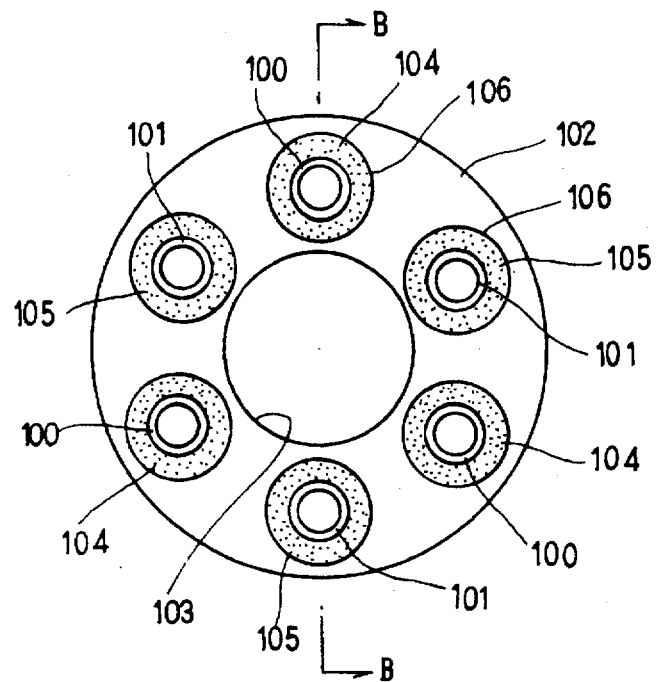
FIG. 1 is a sectional view of a conventional elastic coupling.
Figure 2:
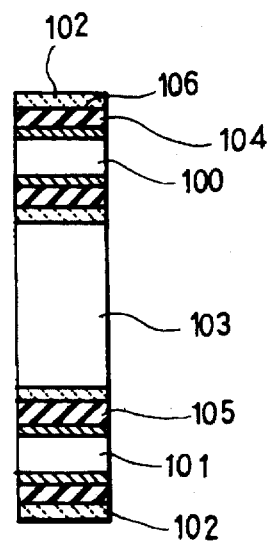
FIG. 2 is a sectional view taken along the line B—B in FIG. 1.
Figure 3:
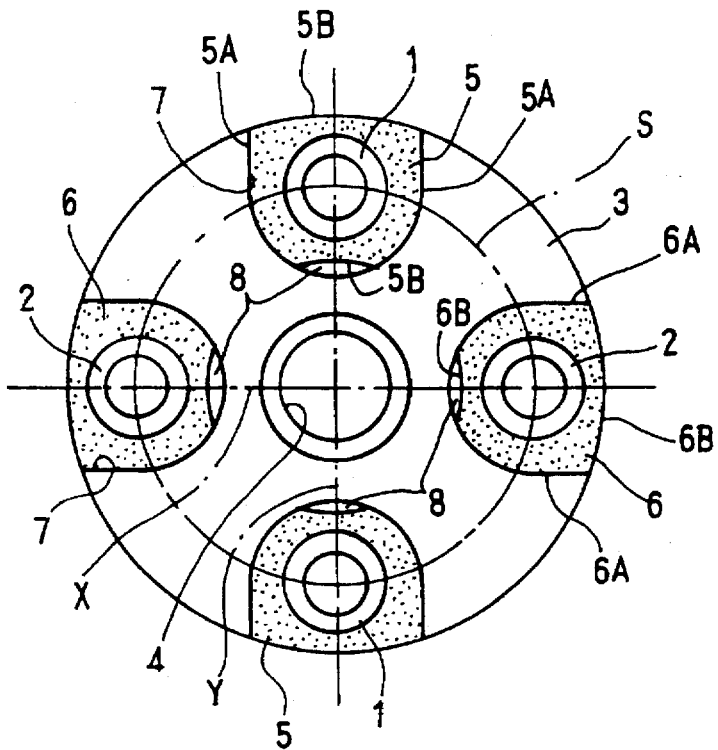
FIG. 3 is a plan view of a first embodiment of the elastic coupling according to the present invention.
Figure 4:
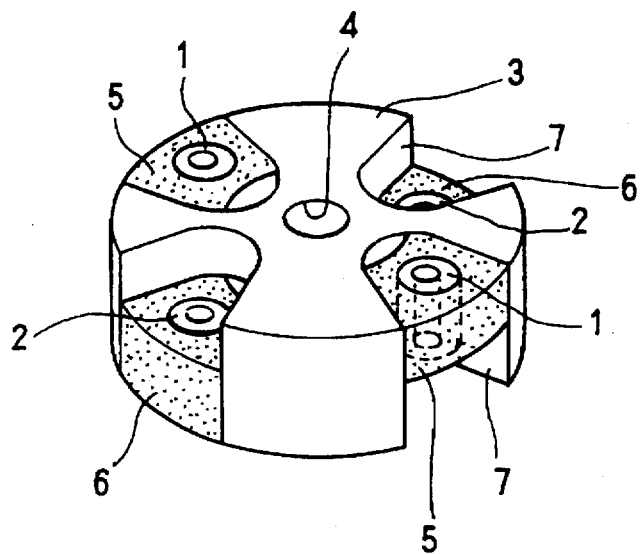
FIG. 4 is a perspective view of the first embodiment shown in FIG. 3.

FIGS. 3 and 4 show the first embodiment of elastic coupling according to the present invention. As seen, the elastic coupling comprises two cylinders 1 for connection to a driving shaft (not shown), two other cylinders 2 for connection to a driven shaft (not shown), and a disc 3 having a central hole 4 formed therein. These cylinders 1 and 2 are disposed alternately on a circle S concentrical to the central hole 4 with their respective centers thereof located on the concentric circle S. As shown, all the cylinders 1 and 2 are disposed on the concentric circle S, but the cylinders 1 may be disposed on one circle concentric to the central hole 4 while the other cylinders 2 are disposed on another concentric circle. The cylinders 1 and 2 are surrounded at the circumference thereof each by elastic members 5 and 6, respectively, made of rubber, which contribute to vibration absorption and dumping of abrupt load as well as to noise reduction when power or torque is transmitted between the shafts connected to each other by the coupling. The disc 3 has cuts 7 formed therein as regularly spaced, and the assemblies of the cylinder 1 and elastic member 5 are located in a pair of the cuts 7 diametrically of the disc 3. This is also true for the assemblies of the cylinder 2 and elastic member 6. Thus, the disc 3 has disposed in place, respectively, therein the elastic members 5 and 6 and holds them independently of each other. The disc 3 is made of nylon in which glass fibers are mixed. The disc 3 serves for holding the elastic members 5 and 6 in place, respectively, and also for transmitting tensile force between the cylinders 1 connected to the driving shaft and the cylinders 2 connected to the driven shaft when power is transmitted from the former to the latter shaft. Generally, the coupling assembly is produced by first adhering the elastic members 5 and 6, by vulcanization, around the cylinders 1 and 2, respectively, setting them in place, respectively, inside a mold used to form the disc 3, and then integrating them together by injection of a synthetic resin into the mold. Alternatively, however, it may be produced by forming the cylinders 1 and 2 and then the elastic members 5 and 6 surrounding the cylinders 1 and 2, respectively, molding the disc 3 having the cuts 7 formed therein, and then forcibly fitting the elastic members 5 and 6 surrounding the cylinders 1 and 2, respectively, into the respective cuts 7. Otherwise, it may be produced by setting the disc 3 and cylinders 1 and 2 in place, respectively, in a vulcanizing mold, and molding rubber, by vulcanization, between the cuts 7 and cylinders 1 and 2 to form the elastic members 5 and 6 which will adhere to both the cylinders 1 and 2 and inner walls of the cuts 7. The elastic members 5 and 6 may be made of natural rubber, synthetic rubber or any one of a variety of synthetic resins.

As shown in FIGS. 3 and 4, the cylinders 1 and 2 are disposed equidistantly from each other on the circle S concentrical to the driving and driven shafts. The elastic members 5 and 6 have lateral portions 5A and 6A, respectively. The lateral portions 5A are symmetrical to each other with respect to a straight line x extending radially of the disc 2 through the centers of the cylinders 1 on the concentric circle S. This is also true for the lateral portions 6A with regard to a straight line y extending similarly to the line x. The elastic members 5 and 6 are joined to the disc 2 at the lateral portions 5A and 6A thereof. The elastic members 5 and 6 have also other (inner and outer) end portions 5B and 6B, respectively. The elastic members 5 and 6 are not joined to the disc 3 at their respective end portions 5B and 6B, respectively. There are defined clearances 8 between the inner end portions 5B and 6B of the elastic members 5 and 6, respectively, nearer to the central hole 4 in the disc 3, and vertical walls of the cuts 7 in the disc 3. The outer end portions 5B and 6B of the elastic members 5 and 6, farther from the center of the concentric circle S, are open outwardly.

Thus, the elastic members 5 and 6 are not joined to the disc 3 at their respective inner and outer end portions 5B and 6B. Compared with other elastic members which are joined all around to the disc, the elastic coupling according to the present invention has a smaller portion contributing to the shear force acting on the elastic members axially thereof, so it is elastically lower axially thereof.

Figure 5:
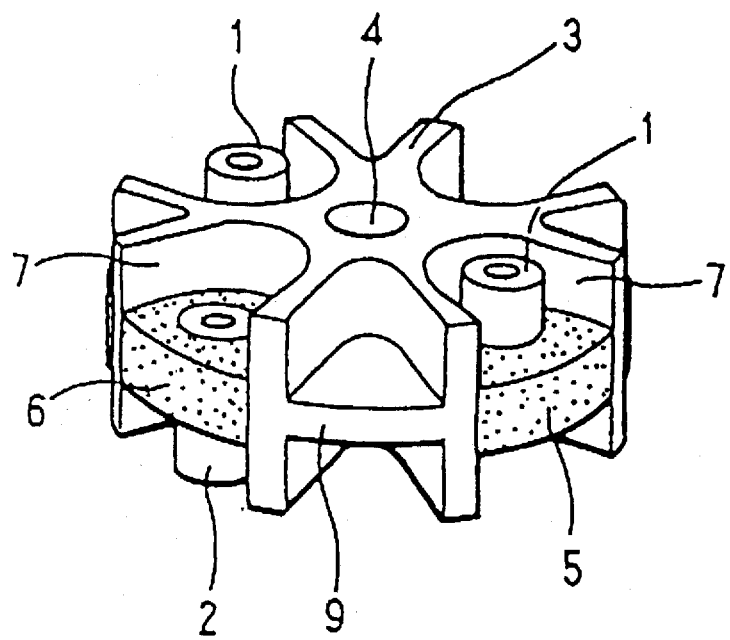
FIG. 5 is a perspective view of a second embodiment of the present invention.

According to the second embodiment of an elastic coupling shown in FIG. 5, the elastic members 5 and 6 are thinner than those in the first embodiment described above with reference to FIGS. 3 and 4. They are joined at both the lateral portions 5A and 6A thereof, respectively, to the walls of the cuts 7 nearly at the middle of the depth of the cuts 7. The cylinders 1 and 2 are projected alternately axially thereof, respectively, from the mating elastic members 5 and 6. Namely, the cylinders 1 are projected at one end thereof upward from one side of the elastic members 5 while they are flush, at the other ends thereof, with the other side of the elastic members 5. On the other hand, the cylinders 2 are projected at one end thereof downward from the other side of the elastic members 6 while they are flush, at the other end thereof, with the other side of the elastic members 6, as shown in FIG. 5. Owing to this design, the cylinders 1 and 2 are limited from being displaced circumferentially of the concentric circle S. Also as shown in FIG. 5, the disc 3 has ribs 9 of about 4 mm in thickness formed integrally therewith between the adjacent cuts 7 nearly at the same height as the elastic members 5 and 6. That is to say, the disc 3 is cut out above and under the ribs 9, as shown in FIG. 5. This design of the disc 3 reduces the weight of the disc 3 itself and also ensures sufficient strength of the disc 3.

Figure 6:
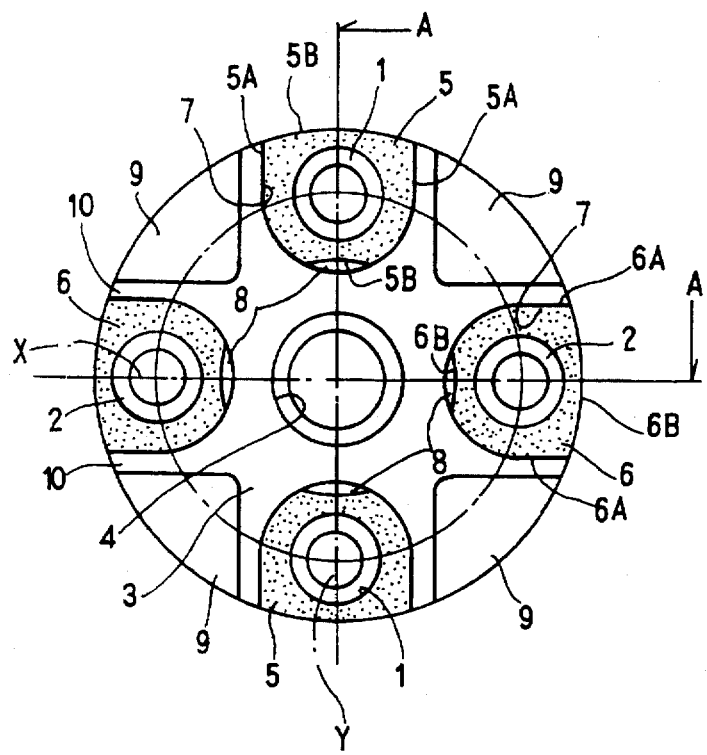
FIG. 6 is a plan view of the elastic coupling in FIG. 5.

FIG. 6 is a plan view of the second embodiment of the elastic coupling in FIG. 5. As seen from FIG. 6, the elastic members 5 and 6 are spaced at the inner end portions 5B and 6B, respectively, by clearances 8 from the boss portion (around the central hole 4) of the disc 3 also in this second embodiment.

Figure 7:
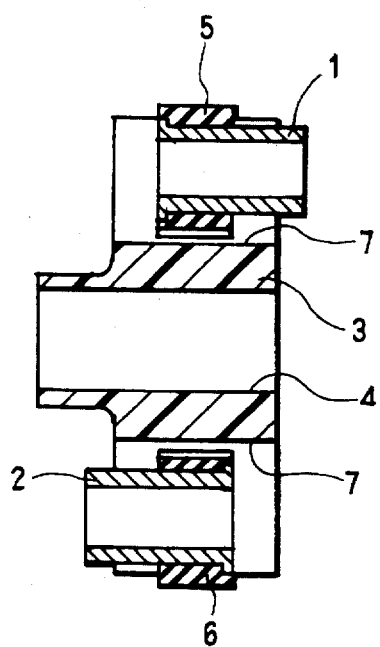
FIG. 7 is a sectional view taken along the line A—A in FIG. 6.
Figure 8:
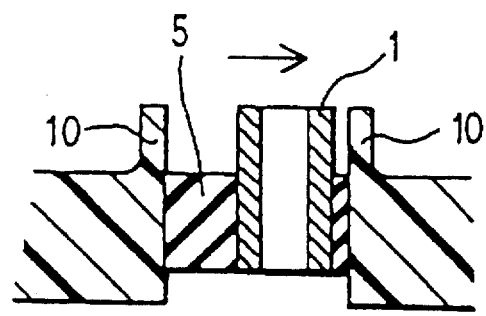
FIG. 8 is a sectional view of the elastic coupling when the cylinders are rotated circumferentially.
Figure 9:
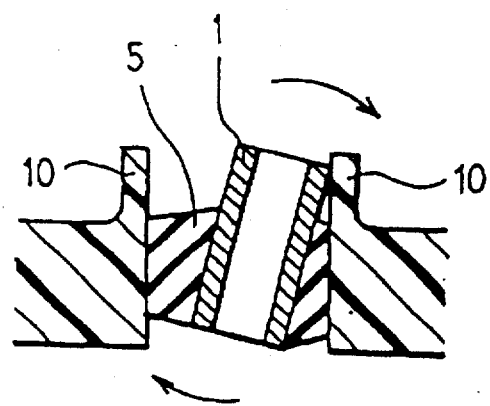
FIG. 9 is a sectional view of the elastic coupling when the cylinders are oscillated.

FIG. 7 is a sectional view taken along the line A—A in FIG. 6. As seen from this Figure, the disc 3 has vertical walls 10 extending axially of the cylinders 1 and 2 and of which two adjacent ones define together each of the cuts 7. The elastic members 5 and 6 are joined nearly at the middle of the height of the vertical walls 10, as also mentioned above with reference to FIG. 5. The vertical walls 10 work effectively as will be described herebelow. When torque or similar force is applied to the coupling in operation, the cylinders 1 (or 2) can be displaced circumferentially of the circle S as shown in FIG. 7 or oscillated as shown in FIG. 9, because the members 5 (or 6) are made of an elastic material. Even when the coupling is applied with a force larger than a predetermined one, the cylinders 1 (or 2) are forced to or abut the vertical walls 10 of the cuts 7 and will be blocked from being further displaced or oscillated. Therefore, the driving and driven shafts can be protected from damage.

Figure 10:
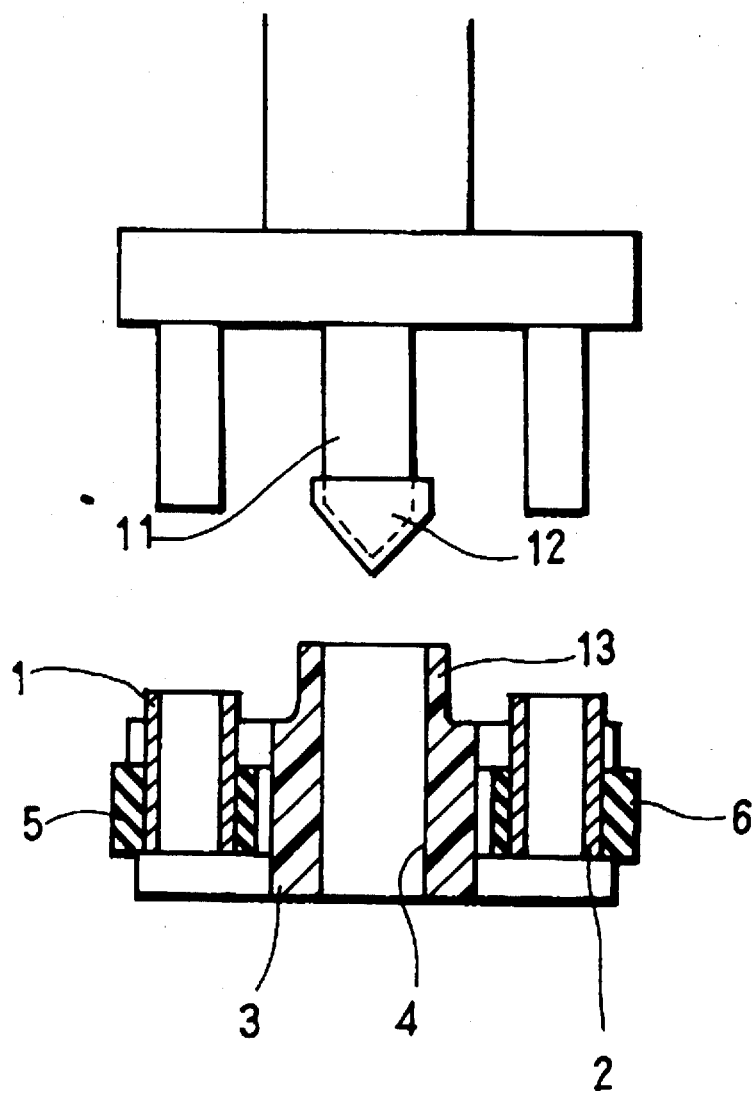
FIG. 10 shows a geometric relationship between the guide shaft and cylinder.

FIG. 10 is an axial sectional view of the central portion of the elastic coupling according to the present invention. It also shows the driving or driven shaft with which the coupling is to be used. As shown, the shaft has a guide shaft 11 provided thereon and covered at the tip thereof with a rubber cap 12, and the coupling has a guide cylinder 13 formed correspondingly to the guide shaft 11 and which is extended axially of the central hole 4 toward the driving or driven shaft. The guide shaft 11 is to be inserted into the central hole 4 through the guide cylinder 13, thus the coupling projections of the driving and driven shaft can be correctly inserted into the cylinders 1 and 2, respectively.

It should be noted that the cylinders 1 and 2 may each be covered with a collar in any of the embodiments described in the foregoing.

As previously described, the elastic members are joined, to the disc, at lateral portions thereof, respectively, on both sides of the radial straight lines passing through the centers of the cylinders 1 and 2 on the circle S concentrical to the driving and driven shafts, but not at the inner and outer end portions thereof, respectively. In other words, the inner end portions of the elastic members are spaced, by the clearances, from the boss portion of the central hole in the disc while the outer ends of the elastic members are exposed on the edges of the disc. Thus, the elastic members are not limited from being moved radially thereof. Therefore, only the compressive elasticity of the elastic members will contribute to the circumferential elasticity, so that the axial elasticity is smaller than the circumferential elasticity. More practically, since the elastic members are not joined at the inner and outer end portions thereof to the disc, the coupling is elastically lower axially thereof, when applied with an axial force, than a coupling of which the elastic members are joined all around to the disc. In case the disc has vertical walls extending axially of the cylinders and of which the two adjacent ones define together each of the cuts and the elastic members are joined ready at the middle of the height of the vertical walls, the cylinders are limited from being displaced circumferentially of the concentric circle. Further, the disc is provided with a guide cylinder at one end of the central hole thereof and the driving or driven shaft has a guide shaft provided thereon. So, when the guide shaft is inserted into the central hole through the guide cylinder, the coupling projections of the driving or driven shaft can be correctly inserted into the cylinders. Furthermore, since the elastic members are disposed at the outer end portions thereof to outside the disc, the radial dimension of the whole elastic coupling can be reduced, thus the coupling can be designed in a manner compact.

What is claimed is:

1. An elastic coupling for connecting a driving shaft and a driven shaft to transmit power from one shaft to the other shaft, comprising:

a disc member having a central hole formed therein;

the disc member having recesses opening outwardly to a periphery of said disc member and extending through said disc member in directions parallel an axis of said central hole to open at opposing surfaces of said disc member;

elastic members disposed in the recesses;

first connecting members for connection to the driving shaft, disposed diametrically in the disc member on a circle concentric with the central hole and within alternate ones of said elastic members;

other connecting members for connection to the driven shaft, disposed diametrically in the disc member on the concentric circle and within other alternate ones of said elastic members, the driving and driven connecting members being alternately and regularly spaced from one another; and said elastic members surrounding the circumferences of the first connecting members and the other connecting members;

each of the elastic members defining a gap between an inner side portion of each elastic member facing the center of the concentric circle and the bottom of the respective recess in the disc member to avoid joining each elastic member to the disc member at the gap;

the elastic members being exposed at respective outermost end portions thereof away from the center of the concentric circle, where the recesses open outwardly, to avoid joining the elastic members to the disc member at the outermost end portion of each elastic member; and the elastic members being joined to the disc member only at portions other than their respective innermost and outermost portions, whereby the elastic member is elastically harder in a direction circumferentially thereof than axially thereof.

2. An elastic coupling according to claim 1, wherein the recesses in which the elastic members are disposed, have vertical walls extending to back and forth from the axial direction of the elastic members and at which the elastic members are joined to the disc member.

3. An elastic coupling according to claim 1, wherein a driving or driven side of the central hole in the disc member is extended axially to form a guide cylinder through which a guide shaft provided at the driving or driven side is to be inserted into the central hole.

4. An elastic coupling according to claim 1, wherein the elastic members are rubber.

* * * * *